Figure 1:
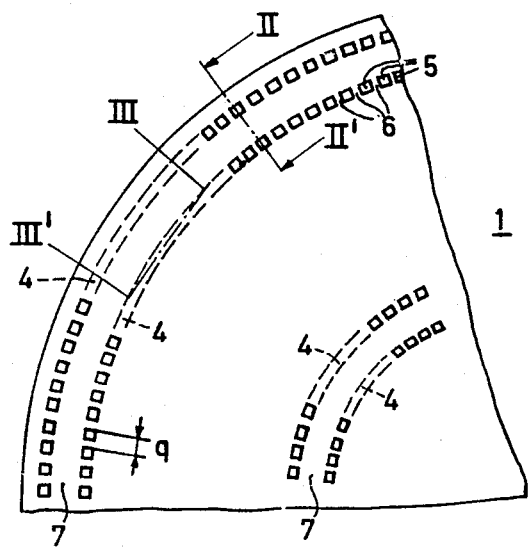

United States Patent [19]

Van Rosmalen et al.

[11] Patent Number: 4,870,508
[45] Date of Patent: Sep. 26, 1989

[54] RECORD CARRIER BODY WITH AN OPTICAL SERVO TRACK AND OPTICAL APPARATUS FOR WRITING AND READING INFORMATION FROM THE CARRIER

[75] Inventors: Gerard E. Van Rosmalen; Wilhelm J. Kleuters, both of Eindhoven, Netherlands

[73] Assignee: U. S. Philips Corporation, New York, N.Y.

[21] Appl. No.: 131,316

[22] Filed: Mar. 18, 1980

Related U.S. Application Data

[63] Continuation of Ser. No. 911,351, Jun. 1, 1978, abandoned.

[30] Foreign Application Priority Data

Mar. 16, 1978 [NL] Netherlands ............................ 7802860

[51] Int. Cl.$^4$ ......................... H04N 5/76; G11B 7/00
[52] U.S. Cl. .................................. 358/342; 369/275; 369/111
[58] Field of Search ................ 369/111, 275; 365/127; 360/135; 358/342

[56] References Cited

U.S. PATENT DOCUMENTS

| | | | |
|---|---|---|---|
| 3,307,157 | 2/1967 | Harper et al. | 365/127 |
| 3,337,718 | 8/1967 | Harper et al. | 369/111 |
| 3,365,706 | 1/1968 | King | 179/100.3 V |
| 3,438,050 | 4/1967 | Aschenbrenner | 179/100.3 V |
| 3,510,658 | 5/1970 | Rabedean | 250/578 |
| 3,636,526 | 1/1972 | Feinleif | 179/100.3 V |
| 3,673,412 | 6/1972 | Olson | 179/100.3 V |
| 3,781,479 | 12/1973 | Swofoda | 179/100.3 V |
| 3,939,302 | 2/1976 | Kihan | 358/128.6 |
| 3,980,818 | 9/1976 | Browning | 346/76 L |
| 4,084,185 | 4/1978 | DeLang et al. | 179/100.3 V |
| 4,123,788 | 10/1978 | Kruger | 179/100.3 V |
| 4,176,377 | 11/1979 | Howe | 360/135 |
| 4,363,116 | 12/1982 | Kleuters et al. | 369/275 |

FOREIGN PATENT DOCUMENTS

| 2048431 | 4/1972 | Fed. Rep. of Germany ... 179/100.3 V |
|---|---|---|
| 1465742 | 3/1977 | United Kingdom . |

*Primary Examiner*—Aristotelis M. Psitos
*Attorney, Agent, or Firm*—Algy Tamoshunas

[57] ABSTRACT

Disclosed is a system for optically recording information on a disc-shaped record carrier body along an information track, with the write spot being accurately guided in the radial and tangential directions. The record carrier body comprises a servo track formed by a constant and large number of servo areas per revolution of the servo track. In addition to a write spot, the write apparatus also projects a servo spot on the servo track. The tangential speed and the radial position of the servo spot relative to the servo track are determined from the modulated servo beam and used to correct the tangential speed and the radial position of the write spot, which is locked to the servo spot.

22 Claims, 3 Drawing Sheets

RECORD CARRIER BODY WITH AN OPTICAL SERVO TRACK AND OPTICAL APPARATUS FOR WRITING AND READING INFORMATION FROM THE CARRIER

This is a continuation, of application Ser. No. 911,351, filed Jun. 1, 1987 now abandoned.

The invention relates to a record carrier body consisting of a round disc-shaped substrate supporting a radiation-sensitive information layer, in which layer information, for example video and/or audio information, can be written in the form of a track-shaped structure of optically detectable information areas by means of a write beam of radiation which is focussed to a write spot. The record carrier body is provided with an optically detectable servo-track which extends over the entire surface area of the record carrier body. The invention also relates to apparatus for writing in the record carrier body, to a record carrier derived from the record carrier body, and to apparatus for reading the record carrier.

The servo track is preferably a spiral track, but it may also comprise a multitude of concentric, circular tracks.

A radiation-sensitive layer is a layer of a material in which a radiation beam produces a change, for example, a photo-sensitive layer or a layer of a material in which areas can be melted by radiation of sufficiently high intensity.

A radiation beam is to be understood to mean a beam of electromagnetic radiation having a wavelength in the range from infrared to ultraviolet.

A record carrier is to be understood to mean a record carrier body provided with information.

It is known to record a television program in a round disc-shaped record carrier in track-wise arranged optically detectable information areas, the information being for example represented by the spatial frequency and the length of the areas. For this the minute information areas, which have, for example, a width of 0.3 $\mu$m and an average length of 0.5 $\mu$m, should be written very accurately in a spiral track with a constant pitch of 1.6 $\mu$m. This means that the rotational speed of the record carrier body should be highly constant and that the write spot of radiation should be moved in the track direction (the tangential direction) and transverse to the track direction (the radial direction) with high accuracy. To do this, the apparatus requires a very accurate drive and guide mechanisms, making it expensive.

The copending U.S. pat. application Ser. No. 127,354 filed Mar. 5, 1980, proposes to provide a record carrier body with a so-called follow-on track. This follow-on track is a continuous optically detectable track. During writing of information, the radial position of the write spot relative to the follow-on track is detected and corrected, so that the information is written in accordance with an accurately defined information track. This obviates the need for the expensive mechanical means for radially moving the radiation spot with very high accuracy.

However, with such an arrangement a very accurate means for rotating the record carrier body with constant speed are still necessary. Moreover, the record carrier body may exhibit eccentricities, so that even at constant speed of rotation the information is not written in the various track portions with the same speed.

The present invention enables information, such as a television program, for which the write speed should be highly constant, to be written by means of comparatively simple apparatus. The invention is embodied in the record carrier body which is used, in the apparatus for writing, in the resulting record carrier, and in apparatus for reading the record carrier.

In accordance with the invention the record carrier body is characterized in that the servo track comprises optically detectable servo areas, a constant and large number of servo areas per revolution of the servo track being provided.

During writing the servo areas are read with the aid of a servo spot of radiation, which is locked to the write spot, so that a signal, a so-called pilot signal, which is proportional to the tangential speed of the write spot, is generated. With the aid of this signal the rate at which the information to be written is applied, or the speed of the write spot, is corrected. It is also possible to record first a part of the information, for example a part of a television program, and then record another part at an arbitrary subsequent instant, the second part joining the first part with very high precision. This makes it possible to record parts of television programs or films on a record carrier body in a new sequence, so-called "mixing". Furthermore, it is possible to record first the picture of a television program in a track and then the sound in the same track, for example, in compressed form, at those locations in the track which contain no video information.

The number of servo areas per revolution depends on the desired accuracy for the tangential speed of the radiation spot. Preferably, the period of the servo areas in the tangential direction will be of the order of magnitude of the period of the servo track in the radial direction. Furthermore, if a television program is written and the servo track remains visible in the finished record carrier, the period of the servo tracks should preferably be selected so that the frequency of the signal which is obtained by reading the servo areas is situated in an information-free part of the frequency spectrum of the television signal.

Since the record carrier body in accordance with the invention has been provided with servo information which is used during writing, the write apparatus need not comply with stringent requirements in respect of the mechanical drive of the optical write head and the record carrier body, and in respect of the vibrationfree suspension of the various optical elements. Instead, these stringent requirements are now imposed on the apparatus by means of which a servo track, consisting of servo areas, is formed in a "master" record carrier body. By means of this expensive apparatus record carrier bodies can be manufactured at one location. Information can then be written on these record carrier bodies at a large number of locations using comparatively cheap write equipment.

It is to be noted that it is known from U.S. Pat. No. 3,701,846 360/33 to write a television program in a record carrier body which is provided with a servo track consisting of areas with a fixed spatial frequency. However, this servo track extends over one revolution and not over the entire surface area of the record carrier body. The servo track is not used for controlling the write speed, but for defining the instants at which the television signal is sampled. The purpose of the servo track is to ensure that the corresponding information areas of all track revolutions have the same initial radial position, so that the adjacent track portions have substantially the same information content. In accordance with the U.S. Pat. No. 3,701,846 a certain cross-talk of the track portions is then permissible and no correction of the radial position of the radiation spot is necessary. In order to obtain accurate tangential control with the aid of a servo track which covers only one revolution, the record carrier body should have a high rigidity. However, in practice the record carrier body rather lacks rigidity. Furthermore, owing to the high speed with which the record carrier body is rotated inaccuracies are introduced. With a record carrier body in accordance with the invention, in which at any arbitrary point servo information is available, the write speed can be controlled accurately even with a non-rigid record carrier body.

The servo track may have an amplitude structure, i.e. that the radiation beam which has internated with the servo track will have a different amplitude than a radiation beam which has not interacted with the servo track. Preferably, the servo track has a phase structure, so that phase differences are produced within a radiation beam which is incident on the servo track.

In accordance with a further characteristic feature of a.record carrier body in accorance with the invention the period in the radial direction of the servo track is several times the width of the servo track. Thus, a plurality of information tracks can be written between the servo track portions at the same time, so that the maximum information transfer rate is substantially increased. This is for example of interest if digitized video information is to be stored.

It is to be noted that it is known per se, for example from German patent specification No. 1,499,422, to write a plurality of information tracks at the same time. However, this is not done on a record carrier body with a servo track consisting of servo areas.

A record carrier body with a servo track in accordance with the invention may be employed for various purposes. First of all professional applications may be considered, as for example in a television studio, where a specific program is to be stored in one or at the most a few record carrier. The record carrier is then read in the same studio, or in another similar studio. A record carrier body is then used which is a pressing from a first so-called "master" record carrier body in which a servo track has been written at a central location.

A record carrier body for this application is characterized in that the information layer consists of a direct-read-after-write material.

If desired, several pressings can be made from the record carrier obtained by writing in this record carrier body.

The record carrier body in accordance with the invention may also be used for the large-scale distribution of a television program, i.e. for making record carriers for the consumer market.

The record carrier body for this application may also be obtained by making pressings from a so-called "master" record carrier body. A record carrier body for this application is characterized in that the information layer consists of a photoresist and that between the photoresist layer and the servo track there is interposed an intermediate layer, whose side which faces away from the servo track is plane, the intermediate layer and the photoresist layer transmitting the radiation of a servo beam with which the servo track is followed during writing.

After the information has been written, i.e. after the photoresist has been exposed intermittently in accordance with the information to be written, the photoresist is developed. Depending on the type of photoresist, either the exposed or the unexposed areas of the photoresist are removed. Subsequently, it is possible to proceed for example first with electroless and then with electrolytic nickel-plating, after which the record carrier body with servo track is removed from the nickel disc. The "father disc" thus obtained may be used as matrix, but generally further so-called first pressings ("mother disc") are made from the father disc, subsequently second pressings thereof, etc. The last-mentioned pressings are then used at the matrixes. Because of the use of the intermediate layer, the servo track is not reproduced in the pressings, and thus is not present in the ultimately obtained record carrier body. The record carriers thus obtained can be read with the aid of previously proposed apparatus.

When making record carriers intended for the consumer market, it is alternatively possible, to deposit the intermediate layer and the photoresist layer directly on said master record-carrier body, instead of first making pressings from said master. This master is then provided with a recording, is developed etc. After the father disc has been separated from the master, the photoresist layer and the intermediate layer can be removed from the master, the servo track remaining intact. The master record carrier body may then be re-used, etc.

For all these applications of the record carrier body a special apparatus for writing the information is employed. This apparatus, which comprises a first radiation source producing a write beam, a second radiation source producing a servo beam, means for switching the radiation intensity of the write beam in accordance with the information to be written, and an objective system for focussing the write beam and the servo beam to a write spot and a servo spot on the information layer, is characterized in that in the path of the servo beam coming from the record carrier body there is included a radiation-sensitive detoctor at whose output a signal is obtained which provides an indication of the local tangential speed of the servo spot which output is connected to an input of a comparator circuit, which at a second input receives a reference signal, which is proportional to the rate at which the information to be written is applied.

When writing in a record carrier body which is provided with an intermediate layer and a photoresist layer, the wavelength of the write beam is adapted to the spectral sensitivity of the photoresist. The servo beam then has such a wavelength that it is not absorbed by the photoresist and the intermediate layer. The information can then be written in a track which radially coincides with the servo track.

An apparatus for writing in a record carrier body whose information layer consists of a direct-read-after-write material, is further characterized in that the write spot and the servo spot are radially offset from each other by a distance of the order of half a radial period of the servo track.

It is to be noted that it is known from German "Auslegeschrift" 2,462,056 to project a second radiation spot on the information layer, in addition to a write spot, during writing-in of a record carrier body. The second radiation spot follows the write spot and has the same radial position. The second radiation spot is employed to read the information areas just written and to compare them with the information to be written, and not to detect the radial position and the tangential speed of the write spot.

An apparatus for simultaneously writing a plurality of information tracks is characterized in that there is provided a plurality of sources of radiation each producing a write beam. The write spots formed by the write beams radially adjoin each other, and the apparatus includes means for switching the intensity of each write beam in accordance with the information to be written by that beam.

A record carrier which is obtained by writing-in a record carrier body with an intermediate layer and a photoresist layer and by subsequently making pressings comprises only an information track.

A record carrier which is obtained by writing in a record carrier body whose information layer consists of a direct-read-after-write material contains a servo track and at least one information track and is characterized in that in the radial direction information-track portions alternate with servo-track portions, that the servo track comprises optically detectable servo areas, the number of servo areas per revolution of the servo track being constant, and that the information track comprises optically detectable information areas whose spatial frequency and/or lengths represent the information.

One of the tracks may then have a phase structure and the other track an amplitude structure. Alternatively, both tracks may have either a phase structure of an amplitude structure. Furthermore, the phase depth of the information track preferably differs from that of the servo track, so that during reading cross-talk from the servo track to the information track is minimized. Phase depth is to be understood to mean the difference between the phase of the beam which has been diffracted in the first order by the track and the phase of the zero-order beam.

For reading a record carrier which is obtained by writing in a record carrier body which is provided with an intermediate layer and a photoresist layer, a known read apparatus may be employed, such as for example that described in "Phillips'Technisch Tijdschrift" 33 No. 7, pages 194–201, which apparatus comprises a radiation source producing a read beam, an objective system for focussing the read beam on the information plane, and a radiation-sensitive detector, which is disposed in the path of the read beam coming from the record carrier, for converting said beam into a signal which represents the stored information. The information track to be read is then also employed as servo track.

An apparatus for reading a record carrier which in addition to an information track also comprises the servo track, is characterized in that there is provided a radiation source which produces a servo beam and that the servo beam is also focussed to a servo spot on the information layer by the objective system and that in the path of the servo beam coming from the record carrier there is included a radiation-sensitive detector for converting the servo beam into an electrical signal which contains information about the local tangential speed and the radial position of the read spot.

Figure 2:
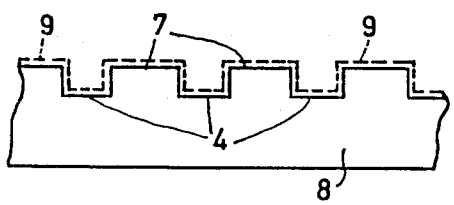
Figure 3:
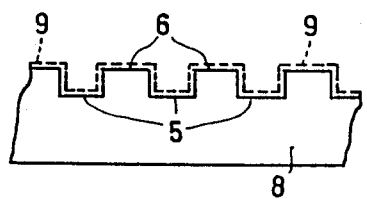
Figure 4:
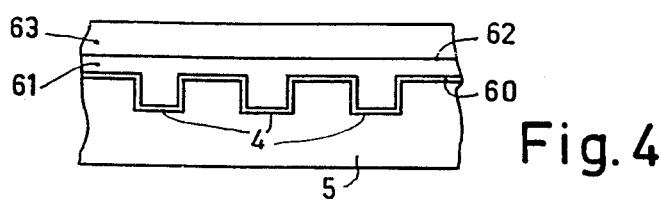
Figure 5:
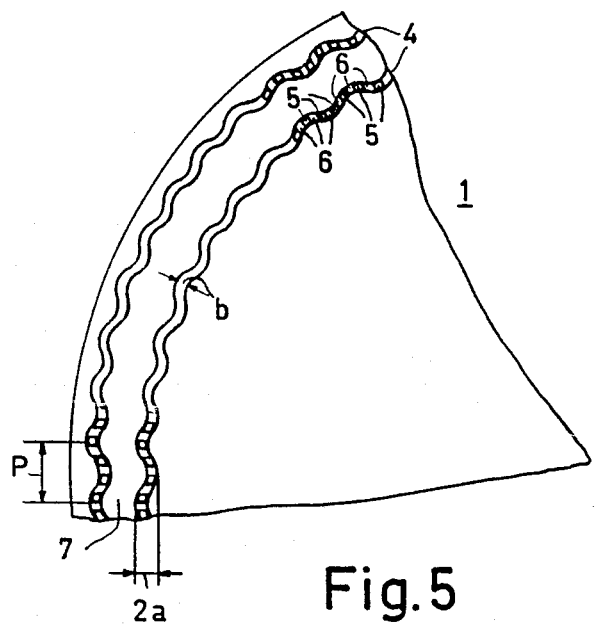
Figure 8:
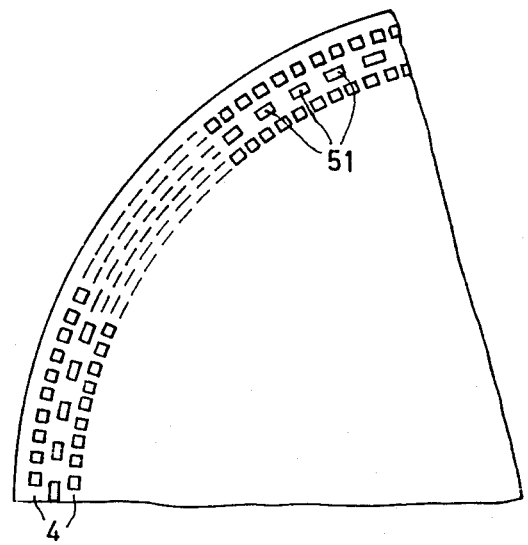
Figure 6:
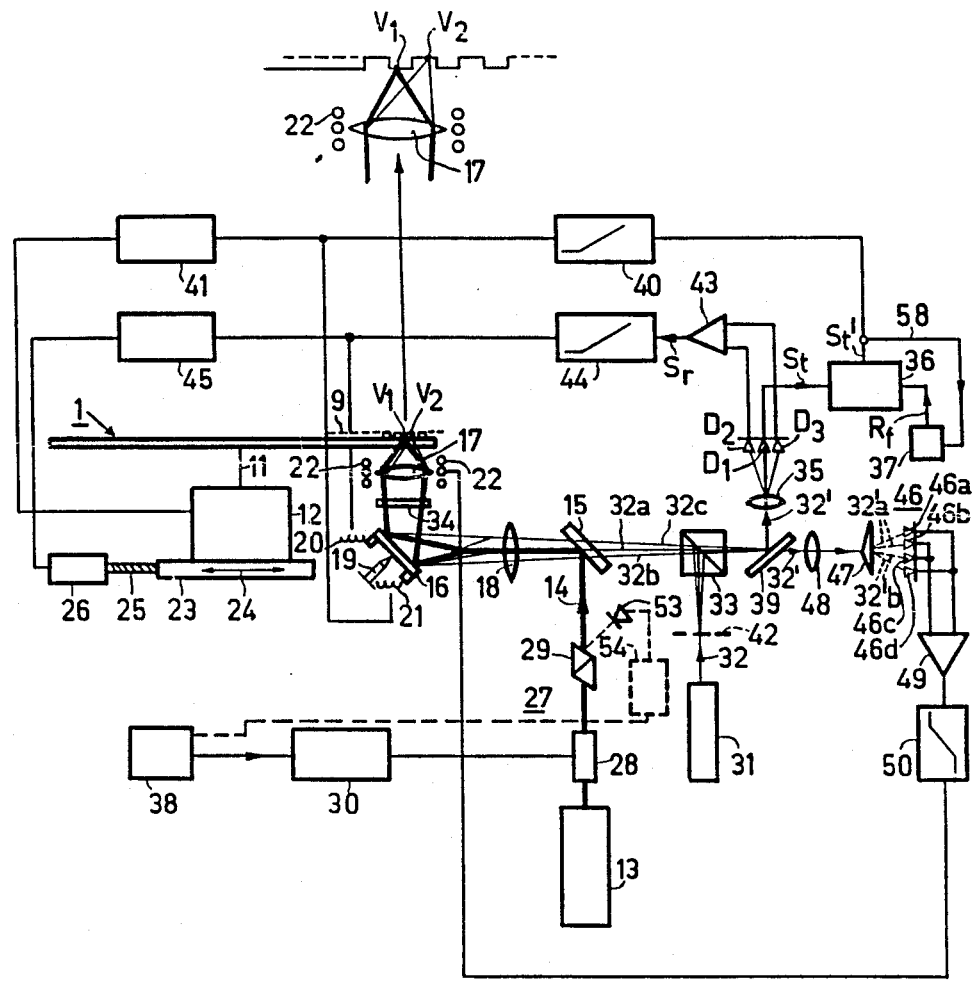
Figure 7:
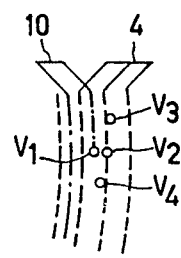

The invention will now be described in more detail with reference to the drawing. In the drawing:

FIG. 1 shows a plan view of a part of a record carrier body in accordance with the invention, FIG. 2 shows a part of a radial cross-section of a first embodiment of the record carrier body, FIG. 3 shows a part of a tangential cross-section of a first embodiment of the record carrier body, FIG. 4 shows a part of a radial cross-section of a second embodiment of the record carrier body, FIG. 5 shows a plan view of a part of a record carrier body with an undulating servo track, FIG. 6 shows an embodiment of an apparatus for writing-in the record carrier body, FIG. 7 shows the positions of the various radiation spots relative to the tracks, and FIG. 8 shows an information carrier derived from the record carrier body in accordance with the invention.

In these Figures similar elements always bear the same reference numerals.

FIG. 1 is a plan view of a part of a record carrier body 1. The carrier may consist of a plastic disc having a thickness of a few mm's and a diameter of the order of a few tens of cm. The carrier body is provided with a spiral-shaped servo track 4. In accordance with the invention the servo track comprises a multitude of servo areas 5, the number of servo areas per revolution of the servo track being constant. During writing the servo track is employed to record the information on the record carrier body in accordance with a well-defined path while the servo areas are employed to record the information with the correct speed. The record carrier body is provided with a layer of a material 9, which if exposed to suitable radiation, is subject to an optically detectable change.

The servo track may have an amplitude structure, the servo areas having a different reflection or transmission coefficient than the intermediate areas 6 and the lands 7. Only the lands 7 are then covered with a radiation-sensitive layer 9.

Preferably, the servo track has a phase structure and the servo areas consist of pits in the substrate. Then, starting from a master record carrier body with a servo track, a large number of record carrier bodies can be manufactured rapidly using known duplicating techniques.

The radiation-sensitive layer 9 may then extend over the entire surface area of the record carrier body. It is obvious that the servo areas 5 may also be projections or bills.

FIG. 2 shows a small part of a cross-section of a preferred embodiment of a record carrier body, taken on the line II—II' in FIG. 1. The radially adjoining portions of the servo track are again designated 4. The longitudinal direction of the servo track is consequently perpendicular to the plane of drawing. The information layer 9 is disposed on the substrate 8.

FIG. 3 shows a small part of a cross-section of the preferred embodiment of the record carrier body taken on the line III—III' in FIG. 1. In this Figure servo areas 5 are indicated.

In the record carrier body of FIGS. 1, 2 and 3 the layer 9 consists of a direct-read-after-write material. The information is written in the lands 7 between the servo track portions 4.

The information layer 9 may consist of a thin metal layer, for example tellurium. The metal layer can be melted locally by laser radiation of sufficiently high intensity, so that locally the information layer is given a different reflection coefficient. Then a record carrier is obtained in which the servo information is contained in a phase structure and the information recorded by the user in an amplitude structure.

The information layer 9 may also take the form of a double layer of materials which chemically react under the influence of incident radiation, for example, aluminium on iron. At the location where a high-energy radiation beam hits the layer 9 FeAl$_6$ is formed, which is a poor reflector. A similar effect is obtained in the case of a double layer of bismuth on tellurium, in which case Bi$_2$Te$_3$ is formed. Alternatively, the layer 9 may consist of an anti-reflection layer. The laser radiation can then produce locally reflecting information areas.

FIG. 4 shows a part of a radial cross-section of a record carrier body which is used for the manufacture of a large number of record carriers. The substrate 5 is for example a plastic. The phase structure of the servo track 4 is covered by an intermediate layer 61 whose surface 62 is plane. On a layer 61 a photoresist layer 63 is deposited. The photoresist layer and the intermediate layer are transparent to the wavelength of the servo beam which is used during writing. To ensure a correct detection of the servo track a reflecting layer 60, for example a layer of aluminium or chromium, has been deposited. The intermediate layer 61 is of a material to which the photoresist adheres well and which is not affected by the write beam. This layer may consist of a transparent lacquer or resin or of a transparent plastic layer. As the write beam and the servo beam have different wavelengths, the write spot may be positioned over the servospot during writing, so that the information track being written is exactly superimposed on the servo track. Of course, it is also possible that the write spot and the servo spot are positioned adjacent each other instead of being exactly superimposed.

After the record carrier body of FIG. 4 has been exposed and developed, a nickel layer of sufficient thickness is deposited onto the layer 63. The nickel disc, to which the information contained in the photoresist layer has been transferred, is subsequently removed and used as a so-called "father" disc for making pressings. The servo track 4 is not reproduced on the "father" disc.

A "master" record carrier body in which the information is written directly also takes the form as shown in FIG. 4. However, the substrate 5 is then for example of glass. The advantage of a glass disc is that it has a high dimensional stability. The servo track 4 is etched into the glass disc. The "master" record carrier body is to be re-used several times. After removal of the "father" disc, the layers 63 and 61 are removed for this purpose, so that the phase structure of the servo track is again situated at the surface. Subsequently, a new layer 61 and a photoresist layer can be deposited, and another program can be written.

For the sake of simplicity FIG. 1 shows only a few revolutions of the servo track. In reality this servo track will cover for example 35,000 revolutions over an area with an inner radius of 7 cm and an outer radius of 14 cm. The period of the servo track in the radial direction is for example 2 $\mu$m and the track width for example 0.3 $\mu$m. The length of the servo areas at a radius of 10 cm is for example 0.5 $\mu$m, which may also be the average length of the information areas being written.

In the write apparatus a servo spot is projected on the servo track. The servo beam coming from the record carrier body is received by the radiation-sensitive detection system. A servo area can be detected in that, if the servo beam is incident on a servo area, for example a pit, the detection system receives a different radiation intensity than if the servo beam is incident between two servo areas. Furthermore, the radiation intensity received by the detection system depends on the degree to which the center of the servo spot coincides with the middle of the servo track.

The dimension of the servo spot is for example of the order of magnitude of the servo track width. When reading the servo track diffraction effects occur, and the servo beam is split into a zero-order subbeam, first-order subbeams and a number of higher-order subbeams. A servo track with a phase structure has a certain phase depth. This is to be understood to mean the phase difference between the zero-order and one of the first-order beams.

The position of the servo spot relative to the middle of the servo track can be detected with the aid of two radiation-sensitive detectors, which are disposed in a plane in which the cross-section of the zero-order subbeam partly overlaps that of the first-order subbeams. The detectors are then disposed on both sides of a line which is effectively parallel to the track direction. Such a tracking method, for reading a record carrier in which a television program is stored, is described in the article: "Optical read-out of a video disc" in: "I.E.E.E. Transactions on consumer electronics", Nov. 1976, page 307. This method may be used for following phase tracks having a certain phase depth.

For radially positioning the servo spot and thus the write spot the servo track may also be an undulating track. FIG. 5 shows a plan view of a part of a record carrier body with an undulating servo track. As described in U.S. Pat. No. 4,223,347, for an information track, the magnitude and the direction of a deviation in the position of a radiation spot relative to the average position of the center line of the servo track can be detected with an undulating track using one detector only. This detector may also be used for reading the individual servo areas, i.e. for determining the tangential speed of the servo spot and thus of the write spot.

For an undulating servo track the spatial frequency (1–p) of the undulation is substantially lower than the spatial frequency (1/q) of the servo areas, so that the modulation in the detector signal as a result of the undulation of the servo track can be distinguished in respect of frequency from the modulation as a result of the sequence of the servo areas. The amplitude (a) of the servo-track undulation is so much smaller than the width (b) of said track, that a sufficiently large portion of the servo spot is always incident on the servo track. The amplitude is for example 1/10 of the track width.

U.S. Pat. Nos. 3,894,179 and 4,057,831 describes a method for optically writing a television program in a carrier body of for example glass, which body is provided with a photoresist layer. The intensity of a laser beam is then switched between a high level and a low level, the switching instants being defined by the information to written. The photoresist layer which moves relative to the laser beam, is thus intermittently exposed in conformity with the information to be written. A similar method may be used for writing a servo track in a record carrier body in accordance with the invention. The intensity of the write beam is then switched between a high and a low level with a fixed frequency of for example 4 MHz. Using known developing and etching techniques the exposed pattern thus obtained can be converted into a depth profile of servo pits which are arranged trackwise. As described in the foregoing the "master" record carrier body which is obtained, after deposition of the intermediate layer and the photoresist layer, can be provided with information. It is also possible to derive a large number of pressings of for example plastic from the "master", using duplicating techniques which are similar to those used in the manufacture of audio records. After these record carrier bodies have been provided with either a direct-read-after-write material or with an intermediate layer and a photoresist layer, they are suitable for writing.

During the manufacture of a "master" record carrier body with an undulating servo track, the direction of the radiation beam is periodically varied through small angles during writing in a manner as described in U.S. Pat. No. 4,223,347. For this purpose a direction modulator, for example an acousto-optical modulator, is included in the path of the radiation beam. Such a modulator comprises a cell with a certain medium, such as water or glass, on which cell electromechanical transducers are mounted. When a signal is applied across those transducers audio waves are produced in the cell. This gives rise to so-called Bragg diffractions in the medium of the cell, so that a radiation beam which passes through the cell is diffracted. The diffraction angle is determined by the frequency of the signal applied across the electromechanical transducers. By periodically and continuously varying said frequency the servo track is written as an undulating track.

FIG. 6 schematically represents an embodiment of a write apparatus in accordance with the invention. The reference numeral 1 designates a round disc-shaped record carrier body, which is provided with a spiral servo track 4. The record carrier body is rotated with the aid of a spindle 11 which is driven by a rotary motor 12. The write light-source 13 is for example an argon laser having a continuous power of 1 Watt and a wavelength of 480 mm, if information is written in the layer 9 by locally melting the layer. The radiation beam 14 which is produced by said laser is reflected to the record carrier body by a first mirror 15 and a second mirror 16 and is focussed to a write radiation spot $V_1$ on the radiation-sensitive layer 9 by an objective 17, for example between the servo track portions 4. The auxiliary lens 18 ensures that the objective is correctly filled, so that the radiation spot $V_1$ has minimal dimensions.

The mirror 16 is a tilting mirror, which is for example journalled on a diamond fulcrum 19 in such a way that it can tilt in two directions, namely about an axis perpendicular to the plane of drawing and about an axis parallel to the record carrier body and perpendicular to the first axis. The tilting movement about the first-mentioned axis, which is realized by an electromagnetic coil 20, enables the radial position of the write spot $V_1$ to be corrected, while the tilting movement about the second axis, which is realized by the electromagnetic coil 21, enables the tangential speed of the write spot to be corrected. Furthermore, the objective 17 is for example suspended in a moving coil 22, so that the objective can be moved along its optical axis. Thus it is possible to correct the focussing of the objective relative to the information layer 9.

The rotary motor 12 is secured to a carriage 23. This carriage can be moved in the direction of the arrow 24 by the lead screw 25, which is driven by the carriage motor 26. By moving the carriage the record carrier body is moved relative to the write spot $V_1$. Thus, in addition to the fine control with the aid of the tilting mirror 16, coarse control of the radial position of the write spot $V_1$ is possible.

In the path of the write beam 14 an intensity modulator 27 is included, with which the intensity of the beam can be switched between a high level, at which a change is produced in the layer 9 and a low level at which such a change does not occur. The modulator 27 is controlled by the modulator control circuit 30, whose input is connected to the information source 38, which supplies the information to be written.

The modulator 27, as is indicated in FIG. 6, may be an electro-optical modulator and comprises an electro-optical crystal 28, which depending on the voltage applied to it, rotates the plane of polarization of the radiation beam, and an analyser 29, which converts the change in polarization into an intensity variation of the radiation beam.

The modulator 27 may alternatively be an acousto-optical modulator and then comprise an acousto-optical cell and an aperture which, for example, only transmits the zero-order beam. If no acoustic wave traverses the cell, no radiation is diffracted and the aperture transmits all radiation to the record carrier body. If an acoustic wave passes through the cell, most of the radiation is diffracted and only a small amount of radiation reaches the layer 9.

The write apparatus comprises a second radiation source 31, for example a helium-neon laser with a continuous power of 5 mW and a wavelength of 632.8 mm. The beam 32 produced by said source is reflected to the mirror 15 by the beam splitter 33. This mirror takes the form of a filter mirror, which transmits the red helium-neon light and reflects the blue argon light. The beam 32 then passes through the elements 18, 16 and 17, so that a servo spot $V_2$ is formed on the servo track.

FIG. 7 by way of example shows how the write spot $V_1$ and the servo spot $V_2$ may be situated relative to the servo track 4. In this Figure the information track written by the write spot is designated 10.

The beam 32 is reflected by the layer 9 and returns along itself. The reflected beam 32' is transmitted by the beam splitter 33 so as to be intercepted by a radiation-sensitive detection system. The beam splitter 33 is for example a polarization selective prism which transmits the beam emitted by the source 31, which beam has a specific direction of polarization. In the radiation path of the beam a $\lambda/4$ plate 34 ($\lambda$ is the wavelength of the beam 32) is disposed in the diagonal position, which plate rotates the plane of polarization of the beam through 45°. Since the beam 32 passes twice through the $\lambda/4$ plate, its plane of polarixation is rotated through a total of 90°, so that the reflected beam 32' is transmitted by the splitter prism 33.

The transmitted beam 32' is reflected to the radiation-sensitive detector $D_1$ by the mirror 34. The auxiliary lens 35 ensures that the radiation is concentrated on the detector. At the output of this detector a signal $S_t$ appears which is modulated in accordance with a sequency of the servo areas. The signal $S_t$ contains information about the tangential speed of the servo spot and, because the write spot is locked to the servo spot, also about the tangential speed of the write spot.

The output of the detector $D_1$ is connected to an input of a comparator circuit 36, to a second input of which is applied a reference signal $R_f$. The circuit 36' comprises a frequency comparison circuit, in which the frequency of the signal $S_t$ is compared with the frequency of a reference source 37. In addition, for finer control, the circuit 36 may comprise a phase comparison circuit for comparing the phase of the signals $S_t$ and $R_f$. This reference source 37 may be constituted by an electronic clock which is connected to the information source 38, which clock determines the rate at which the information to be written is applied to the write apparatus. The signal $S'_t$ at the output of the circuit 36 is employed for adapting the clock signal and the tangential speed of the write spot to each other.

If the apparatus is used for writing on a record carrier body with an intermediate layer and a photo-resist layer, the servo track no longer being present in the finished record carrier, the signal $S_t$ may be used for correcting a clock frequency of the electronic clock 37, as is indicated by the line 58 in FIG. 6. If the apparatus is used for writing in a layer of a direct-read-after-write material, the servo track being present in the record carrier, the signal $S'_t$ is used for correcting the tangential speed of the write spot. For this purpose the signal is applied to a tangential controller 40 whose output is connected to the coil 21. In order to keep within the field of view of the objective 17, it is possible to control the speed of the rotation motor via the motor control 41. The control signal for this may be derived from the deviation in the tangential direction of the tilting mirror 16 relative to its central position.

For deriving a control signal for the radial position of the write spot $V_1$ the aforementioned method with an undulating servo track may be employed. It is alternatively possible, as is also indicated hereinbefore, to use two sub-detectors instead of one detector $D_1$, the servo track being a non-undulating track. One of these sub-detectors is then situated in the area of overlap of the zero-order beam and the +1-order subbeam, and the second sub-detector in the area of overlap of the zero-order beam and the −1-order subbeam. The difference of the output signals of the sub-detectors is determined by the magnitude and the direction of a deviation in the radial position of the servo spot relative to the servo track. The signal which is obtained by adding the output signals of the subdetectors to each other is the same as the signal supplied by the single detector $D_1$ and it is again possible to derive a tangential speed control signal from said signal.

FIG. 6 illustrates a different method for deriving a radial control signal. Included between the radiation source 31 and the beam splitter 33 is a beam splitter, for example a grating 42. This grating splits the radiation beam 32 into a zero-order beam 32a and a +1-order beam 32b and a −1-order beam 32c. The beam 32a is focussed on the layer 9 to the servo spot $V_2$ and the beams 32b and 32c are focussed to the auxiliary spots $V_3$ and $V_4$. As shown in FIG. 7, the auxiliary spots $V_3$ and $V_4$ are tangentially and radially offset relative to the servo track $V_2$ in opposite sense. The centers of the auxiliary spots are situated at the two edges of the servo track when the center of the servo spot is at the middle of the servo track.

After reflection at the layer 9 the beams 32a, 32b and 32c pass through the elements 17, 34, 16, 18, 15, 33, 39 and 35. The servo spot 32a is imaged on the detector $D_1$. The beam 32a has the same function as the beam 32 discussed in the foregoing. The auxiliary spots $V_3$ and $V_4$ are imaged on the radiation-sensitive detectors $D_2$ and $D_3$. It will be evident that, if the radial position of the servo spot $V_2$ and thus the position of the write spot $V_1$ is correct, the intensities at the detectors $D_2$ and $D_3$ are equal. If there is a deviation in the radial position of the servo spot relative to the servo track, one of the detectors $D_2$ and $D_3$ will receive more radiation than the other. The difference in the output signals of the detectors $D_2$ and $D_3$ thus depends on the magnitude and direction of a radial position error of the servo spot and thus of the write spot.

The output signals of the detectors $D_2$ and $D_3$ are applied to a differential amplifier 43, at whose output appears a radial error signal $S_r$. This signal is applied to a radial controller 44. The output of said controller is connected to the coil 20 for radially tilting the mirror 16. Said mirror is tilted in such a way that the signal $S_r$ becomes zero. In order to keep within the field of view of the objective 17, there has been provided control of the carriage motor via the carriage motor control 45. The control signal for this purpose may be derived from the radial deviation of the tilting mirror 16 from its central position.

In order to generate a focussing error signal, which provides an indication of a deviation between the plane of focussing of the objective 17 and the plane of the information layer, the apparatus may for example be provided with a second radiation-sensitive detection system 46, which is disposed behind the semi-transparent mirror 39. The detection system comprises four subdetectors 46a, 46b, 46c and 46d. Between the semi-transparent mirror 39 and the detection system 46 there is included an optical wedge 47. Said wedge splits the beam 32', which has been reflected by the record carrier body, into two subbeams 32'a and 32'b which cooperate with the detectors 46a and 46b and with 46c and 46d respectively. The auxiliary lens 48 serves to image the exit pupil of the objective 17 on the detection system 46 and to focus the beam 32' at the apex of the wedge 47.

FIG. 6 represents the situation in which the beam 32 is exactly focussed on the layer 9. The focus of the reflected beam 32' is then situated exactly on the apex of the wedge 47, and the subbeam 32'a and 32'b is then symmetrically incident at the detectors 46a and 46b, and the detectors 46c and 46d respectively. If the focus of the beam 32 were situated above the layer 9, the focus of the beam 32' would be situated to the left of the apex of the wedge. In that case the subbeams 32'a and 32'b would be shifted inwards, i.e. the detector 46b or 46c would receive more radiation than the detector 46a and 46d respectively. If the focus of the beam 32 is situated underneath the layer 9, the reverse situation is obtained.

The outputs of the detectors 46a and 46d are connected to a first input, and the outputs of the detectors 46b and 46c to a second input of a differential amplifier 49 at whose output the focussing error signal $S_f$ appears. This signal is applied to the controller 50 for the focussing, which controller controls the current through the coil 22 of the objective 17, and thus the position of the objective relative to the plane of the information layer 9.

An advantage of the focussing-error detection system in accordance with FIG. 6 is that the influence on the focussing error signal $S_f$ of a shift of the detection system 46 relative to the wedge 47 or other optical elements of the light path transverse to the direction of the beam 32' can be eliminated. If the wedge is shifted relative to the detection system 46, the subbeams 32'a and 32'b are shifted in the same direction over the associated detectors 46a and 46b and the detectors 46c and 46d. By adding the signals from the detectors 46a and 46c to each other, as well as the signals from the detectors 46b and 46d, and subtracting the resulting sum signals from each other, a positional error signal is obtained. By means of this signal the position of for example the wedge 47 relative to the detection system 46 transverse to the beam direction can be corrected.

So far it has been assumed that the layer 9 is a reflecting layer. However, the invention may also be used in the case of a radiation-transmitting information layer. The detectors $D_1$, $D_2$ and $D_3$ may then be disposed in the path of the radiation beam which passes through the record carrier body. Instead of the focussing detection system in accordance with FIG. 6, which employs the reflection at the layer 9, a focussing detection system may be used which utilizes the servo information. For example two detectors may then be disposed tangentially behind each other in the path of the radiation beam coming from the record carrier body, as is described in U.S. Pat. No. 4,010,317. The phase difference of the output signals of the two detectors depends on the degree to which the radiation beam has been focussed at the plane of the track.

In the apparatus of FIG. 6 gas lasers are used as radiation sources. For reading a recording use is also made of semiconductor diode lasers. Furthermore, the Applicant has succeeded in writing on a suitable material (tellurium) by means of a semiconductor diode laser. In the apparatus in accordance with FIG. 6 the gas lasers may therefore be replaced by diode lasers.

The final record carrier which is obtained by writing in a record carrier body in accordance with FIG. 4 and subsequently copying it, has a known shape and may be read with known apparatus. This record carrier and read apparatus are for example described in "Philips'-Technisch Tijdschrift" 33, No. 7, pages 194-197.

FIG. 8 shows a plan view of a part of a record carrier which is obtained by writing-in a record carrier body in accordance with FIGS. 2 and 3. In the record carrier of FIG. 8 information track portions 10; comprising information areas 51, are disposed between the servo track portions 4. The frequencies, and as the case may be the lengths of these areas are determined by the information which is stored.

For reading a record carrier in accordance with FIG. 8 a special read apparatus is to be used, namely an apparatus in which, in addition to a read beam, a servo beam is generated. Such apparatus comprises similar servo systems for the radial position and the tangential speed of the read spot and for focussing the read beam as the apparatus in accordance with FIG. 6. Said apparatus differs from the apparatus of FIG. 6 only in that the elements 38, 30, 28 and 29 are dispensed with, that the radiation source 31 has been replaced by a source producing a lower radiation energy, and that between this radiation source and the mirror 15 there is disposed a semi-transparent mirror, which reflects the read beam, which has been reflected by the record carrier, to a radiation-sensitive information detector. The output signal of the last-mentioned detector is modulated in accordance with the information being read.

The apparatus of FIG. 6 may also be used for checking whether the information has been written correctly. Then, after writing, the intensity of the beam can be set to a constant and low level and the record carrier can be scanned once again. The information being read is then compared with the information from the information source 38.

Checking is also possible during writing. Use can then be made of the part of the write radiation which is reflected by the information layer, which part depends on the local condition of the layer 9. This part of the radiation is reflected by the mirrors 16 and 15 and the front of the analyser 29 and is intercepted by an additional detector 53. The signal from this detector can be compared with the signal from the information source 38 in the comparator circuit 54.

In practice, the read spot and the servo spot will be slightly larger than the width of the information track and the servo track respectively, so that the possibility of crosstalk from the servo track to the information track and vice versa is not excluded. However, there are a number of methods of reducing this crosstalk.

As described hereinbefore, the servo track may have a phase structure and the information track an amplitude structure. This is for example the case when writing information on bismuth or tellurium. If the servo track and the amplitude track are read in accordance with different optical methods, the crosstalk may be reduced. The amplitude structure may then be read with a single detector on which all read radiation coming from the record carrier is concentrated. The phase structure is read with two detectors which are disposed in the exit pupil of the objective 17, or in an image of said exit pupil, on both sides of a line which extends effectively transversely to the track direction. One of the detectors is then disposed in the area of overlap of the zero-order beam and the $+1$-order beam and the other detector in the area of overlap of the zero-order beam and the $-1$-order beam. The first-order beams are then the beams which are produced by diffraction, in the track direction, of radiation at the areas in the phase track. A reduction of the crosstalk can also be obtained by selecting different phase depths for the two tracks. For a track with a phase structure, in the case of a specific optical read-out, there is a certain optimum phase depth, for example $\pi$ rad. The difference between the radiation intensities received by the detector if the radiation beam is incident at an area and if the radiation beam is incident between two areas is then a maximum. When such a track is scanned the detector is then modulated in an optimum manner. Now steps can be taken that in the case of a specific optical read-out the information track has the optimum phase depth, while the servo track has a different phase depth and thus will only give rise to reduced crosstalk in the information signal.

A further method of reducing crosstalk from the servo track to the information track is by simultaneously reading an information track portion and the two servo track portions situated on both sides thereof with the aid of two additional radiation spots. The output signals of the additional detectors associated with the additional radiation spots can then be added to each other. The sum signal can be attenuated by a factor K and then be applied to an input of a differential amplifier, to a second input of which is applied the signal from the information detectors, which reads the information track, is applied. When the attenuation factor K equals the ratio of the amplitude of the component in the information detector signal as a result of the information track and the amplitude of the component as a result of the servo track portions, a signal is obtained at the output of the differential amplifier in which the influence of the servo track has been considerably reduced.

In the apparatus described so far one write spot is used during writing and one read spot during reading. The maximum information transfer rate $T_r$ is limited by the frequency with which the write radiation can be switched; in the case of a diode laser as write source it is limited by the frequency with which the electric current through the diode laser can be switched. In addition, the maximum information transfer rate is limited by the speed with which the record carrier body and the record carrier can be rotated and by the maximum spatial frequency of the areas in the track. The maximum spatial frequency is the spatial frequency of those areas which can still be read separately.

The maximum information transfer rate can be increased by selecting the pitch of the servo track in the record carrier body comparatively large and by writing with several write sources and reading with several read sources. This is in particular of importance if video information is to be written in digitized form. The information transfer rate should then be substantially higher than in the case that the video information is written as a frequency-modulated signal. The write beams produced by the various write sources are individually intensity-modulated. The read beams produced by the various read sources cooperate with individual information detectors. Some of the write spots may be projected at one side of the servo track and the other write spots on the other side of said track. The servo information is then situated as closely as possible to each information track to be written. Writing by means of a plurality of write spots is particularly interesting if diode lasers can be used as write and read sources.

If between the servo track portions there is room for a plurality of information tracks, it is for example possible to record a video signal in the first information track and an audio signal in the second information track. The video signal may then be recorded during a first write process, and the associated audio signal during a second write process at an arbitrary subsequent instant.

What is claimed is:

1. In an appartus for writing information in a record carrier body provided with a radiation sensitive layer and a servo track comprised of optically detectable spaced apart servo areas, the apparatus comprising a first radiation source which produces a write beam, a second radiation source which produces a servo beam, means for switching the radiation intensity of the write beam in accordance with the information to be written, an objective system for focussing the write beam and the servo beam to a write spot and a servo spot on the information layer and the servo track, respectively, and means for producing relative movement between said spots and said record carrier body, the improvement wherein in the path of the servo beam coming from the record carrier body there is included a radiation-sensitive detector at whose output a signal is obtained which provides an indication of the speed of the servo spot relative to said carrier body, a comparator circuit having a first input connected to the output of the radiation sensitive detector and a second input for receiving a reference signal proportional to the rate at which the information to be written is applied.

2. Apparatus as claimed in claim 1, wherein said record body is disc-shaped and said servo track is comprised of a plurality of generally, circular, concentric servo track portions, and wherein the write spot and the servo spot are radially offset relative to each other by a distance of the order of half a radial spacing between adjacent servo track portions.

3. Apparatus as calimed in claim 1, including a plurality of write sources of radiation each producing a write beam, the write spots formed by the write beams being radially displaced from each other, and means associated with each write beam for switching the intensity of the write beam in accordance with the information to be written by the relevant beam.

4. A record carrier body for storing information recorded by a write beam of radiation, said carrier body comprising a substrate provided with a radiation sensitive layer and a plurality of spaced apart, optically detectable servo areas defining an elongated servo track for guiding said write beam during recording so that the information is recorded on said radiation sensitive layer along an information track spaced from said servo track upon relative movement of said body and said write beam, said servo areas being spaced from each other by a constant distance in the longitudinal direction of said servo track so that, upon illumination of said servo track by a beam of radiation, said servo areas produce a periodic change in the beam which is proportional to the speed of said relative movement; said constant distance being such that said periodic change has a frequency which is substantially outside the frequency spectrum of the information to be recorded.

5. A record carrier body as claimed in claim 4, when the servo track has a phase structure.

6. The record carrier body according to claim 4 including a plurality of said servo tracks, said servo tracks being generally parallel and spaced from each other with the radiation sensitive layer extending between adjacent pairs of said servo tracks so that said information is written in at least one information track which is generally parallel to and extends between adjacent pairs of said servo tracks.

7. The record carrier according to claim 4 wherein said radiation sensitive layer comprises a photoresist.

8. The record carrier according to claims 4 or 7 including an intermediate layer which is disposed between said substrate and said radiation sensitive layer and which extends over and covers said servo track, said intermediate layer and said radiation sensitive layer being transparent to said radiation with which said servo track is illuminated.

9. Apparatus for recording information on a record carrier body provided with a radiation sensitive layer and an optically detectable, elongated servo track comprised of a plurality of spaced apart servo areas, said apparatus comprising means for producing a write beam of radiation, means for modulating said write beam in accordance with information to be recorded, means for producing a servo beam or radiation, means for focussing said write beam and said servo beam to a write spot and a servo spot on said radiation sensitive layer and said servo track, respectively, means for producing relative movement between said record body and said spots, means for detecting radiation of said servo beam coming from said record body which has been modulated by said servo track, said detecting means producing a first signal indicative of the speed of movement of said servo spot relative to said record carrier body, and means responsive to said first signal for controlling the rate at which said information is recorded on said record body.

10. The apparatus according to claim 9 wherein said controlling means includes means for comparing said first signal with a reference signal and generating a second signal indicative of the difference therebetween.

11. The apparatus according to claim 10 including means responsive to said second signal for deflecting said spots relative to said body in a direction generally parallel to said servo track.

12. The apparatus according to claims 10 or 11 including means, responsive to said second signal, for varying the speed of said relative movement.

13. The apparatus according to claims 9 or 11 wherein said write spot and said servo spot are spaced from each other by a predetermined distance in a direction perpendicular to the longitudinal direction of said servo track, and said detecting means includes further means for producing a third signal indicative of the dislacement of said servo spot from the center of said servo track in a direction transverse to the servo track and including means responsive to said third signal for moving said write spot relative to said body in a direction parallel to said transverse direction.

14. A record carrier comprising a disc-shaped substrate having a plurality of generally circular, concentric information track portions each comprised of a plurality of spaced apart information areas representing information readable by a read beam of radiation, and a generally circular servo track portion disposed between adjacent information track portions for radially guiding the read beam, said servo track portions being comprised of a plurality of optically detectable spaced apart servo areas, said servo areas in each circular servo track portion being spaced from each other by a predetermined, constant distance so that, upon illumination of said servo track portions by a beam of radiation, said servo areas produce a periodic change in the beam which is proportional to the speed of movement of said beam of radiation relative to said body; one of said information track portions and said servo track portions having a phase structure and the other of said information track portions and servo track portions having an amplitude structure.

15. An apparatus for reading information stored on a disc-shaped record carrier provided with a plurality of optically detectable servo areas which are spaced from each other by a constant distance and which define a generally circular servo track, and an optically readable information track radially spaced from said servo track, said apparatus comprising means for producing a read beam of radiation, means for focussing said read beam to a read spot on said information track, means for rotating said record carrier so that said read spot scans said information track and is modulated thereby in accordance with the information stored therein, means for detecting said radiation of said read beam which is modulated by said information track, said detecting means producing a signal representative of the stored information, means for producing a servo beam of radiation, means for focussing said servo beam to a servo spot on said servo track and at a predetermined distance from said read spot so that upon rotation of said record carrier said servo beam is modulated by said servo track, and means for detecting the radiation of said servo beam which has been modulated by said servo track, said last-named detecting means producing a second signal representative of the local tangential speed and the radial position of said read spot relative to said information track.

16. Apparatus for recording information on a record carrier body provided with a radiation sensitive layer and an optically detectable, elongated servo track comprising a plurality of servo areas spced from each other by a predetermined distance in the longitudinal direction of said servo track, said apparatus comprising means for producing a write beam of radiation, means for modulating said write beam in accordance with information to be recorded, means for producing a servo beam of radiation, means for focussing said write beam and said servo beam to a write spot and a servo spot on said radiation sensitive layer and said servo track, respectively, means for producing relative movement between said record body and said spots, means responsive to radiation of said servo beam coming from said record body which has been modulated by said servo track for producing a first signal indicative of the speed of movement of said servo spot relative to said record carrier body in said longitudinal direction and a second signal indicative of the displacement of said servo spot from the center of said servo track in a direction transverse to said longitudinal direction, first means responsive to said first signal for controlling the speed of said relative movement and second means responsive to said second signal for moving said write spot in a direction transverse to said longitudinal direction.

17. The apparatus according to claim 16, wherein said signal producing means includes a radiation sensitive detector disposed in the path of said modulated radiation of said servo beam coming from said record carrier body.

18. The apparatus according to claim 14, wherein said write spot is spaced a predetermined distance from said servo spot in a direction transverse to said servo track so that upon said relative movement, the information is recorded by said write spot along an information track which is generally parallel to and spaced from said servo track.

19. The apparatus according to claim 17 including means for producing, from said radiation of said servo beam, a pair of auxiliary beams which are focussed by said focussing means into a pair of auxiliary spots on said record carrier body, each of said auxiliary spots being offset in opposite directions from said servo spots, and wherein said signal producing means includes further means for detecting radiation of said auxiliary beams coming from said record carrier.

20. A record carrier body for storing information which is recorded thereon by a write beam of radiation, said carrier body comprising a substrate provided with a plurality of servo areas defining an elongated servo track which is detectable by a servo beam of radiation having a wavelength different from that of the write beam, said servo areas being spaced from each other by a predetermined distance in the longitudinal direction of said servo tracks, said carrier body further comprising a layer which is sensitive to the radiation of said write beam and which extends over and covers said servo track, said layer being transparent to the radiation of said servo beams so that when said servo track is scanned by said servo beam, said servo areas produce a periodic change in the beam which is proportional to the speed of relative movement between said carrier body and said servo beam for controlling the rate at which the information is recorded by the write beam on said layer and for guiding said write beam so that the information is recorded along an elongated information track at a predetermined position spaced from said servo track.

21. The record carrier body according to claim 20 including an intermediate layer disposed between said substrate and said radiation sensitive layer, said intermediate layer being transparent to the radiation of the servo beam.

22. The record carrier according to claim 20 wherein said radiation sensitive layer comprises a photoresist.

* * * * *